US011029031B2

(12) United States Patent
Sobanski et al.

(10) Patent No.: US 11,029,031 B2
(45) Date of Patent: Jun. 8, 2021

(54) TAPERED PANEL RAIL

(71) Applicant: UNITED TECHNOLOGIES CORPORATION, Farmington, CT (US)

(72) Inventors: Jon E. Sobanski, Glastonbury, CT (US); Steven D. Porter, Wethersfield, CT (US)

(73) Assignee: Raytheon Technologies Corporation, Farmington, CT (US)

(*) Notice: Subject to any disclaimer, the term of this patent is extended or adjusted under 35 U.S.C. 154(b) by 225 days.

(21) Appl. No.: 16/053,296

(22) Filed: Aug. 2, 2018

(65) Prior Publication Data
US 2020/0041132 A1 Feb. 6, 2020

(51) Int. Cl.
F23R 3/60 (2006.01)
F23R 3/00 (2006.01)
F23R 3/50 (2006.01)

(52) U.S. Cl.
CPC ............... F23R 3/60 (2013.01); F23R 3/002 (2013.01); F23R 3/50 (2013.01); F23R 2900/00018 (2013.01); F23R 2900/03041 (2013.01); F23R 2900/03042 (2013.01); F23R 2900/03044 (2013.01)

(58) Field of Classification Search
CPC .... F23R 3/60; F23R 3/50; F23R 3/002; F23R 2900/00018
See application file for complete search history.

(56) References Cited

U.S. PATENT DOCUMENTS

| | | | | |
|---|---|---|---|---|
| 4,934,145 A * | 6/1990 | Zeisser | ................... | F23R 3/002 60/740 |
| 7,140,185 B2 | 11/2006 | Burd | | |
| 2003/0213250 A1* | 11/2003 | Pacheco-Tougas | ..... | F23R 3/002 60/752 |
| 2013/0025287 A1 | 1/2013 | Cunha | | |
| 2016/0131365 A1 | 5/2016 | Tu et al. | | |
| 2016/0258626 A1 | 9/2016 | Moura et al. | | |
| 2017/0009988 A1 | 1/2017 | Cunha et al. | | |

OTHER PUBLICATIONS

European Patent Office, European Search Report dated Jan. 2, 2020 in Application No. 19189596.0.
European Patent Office, European Office Action dated Oct. 2, 2020 in Application No. 19189596.0.

* cited by examiner

Primary Examiner — Steven M Sutherland
(74) Attorney, Agent, or Firm — Snell & Wilmer L.L.P.

(57) ABSTRACT

A heat shield panel for use in a gas turbine engine combustor is disclosed. In various embodiments, the heat shield panel includes a hot side, a cold side spaced from the hot side, and a rail disposed about a periphery of the cold side, the rail including a first rail member having a first length extending along the panel, a first height extending from the cold side, and a first thickness that varies along the first length.

18 Claims, 6 Drawing Sheets

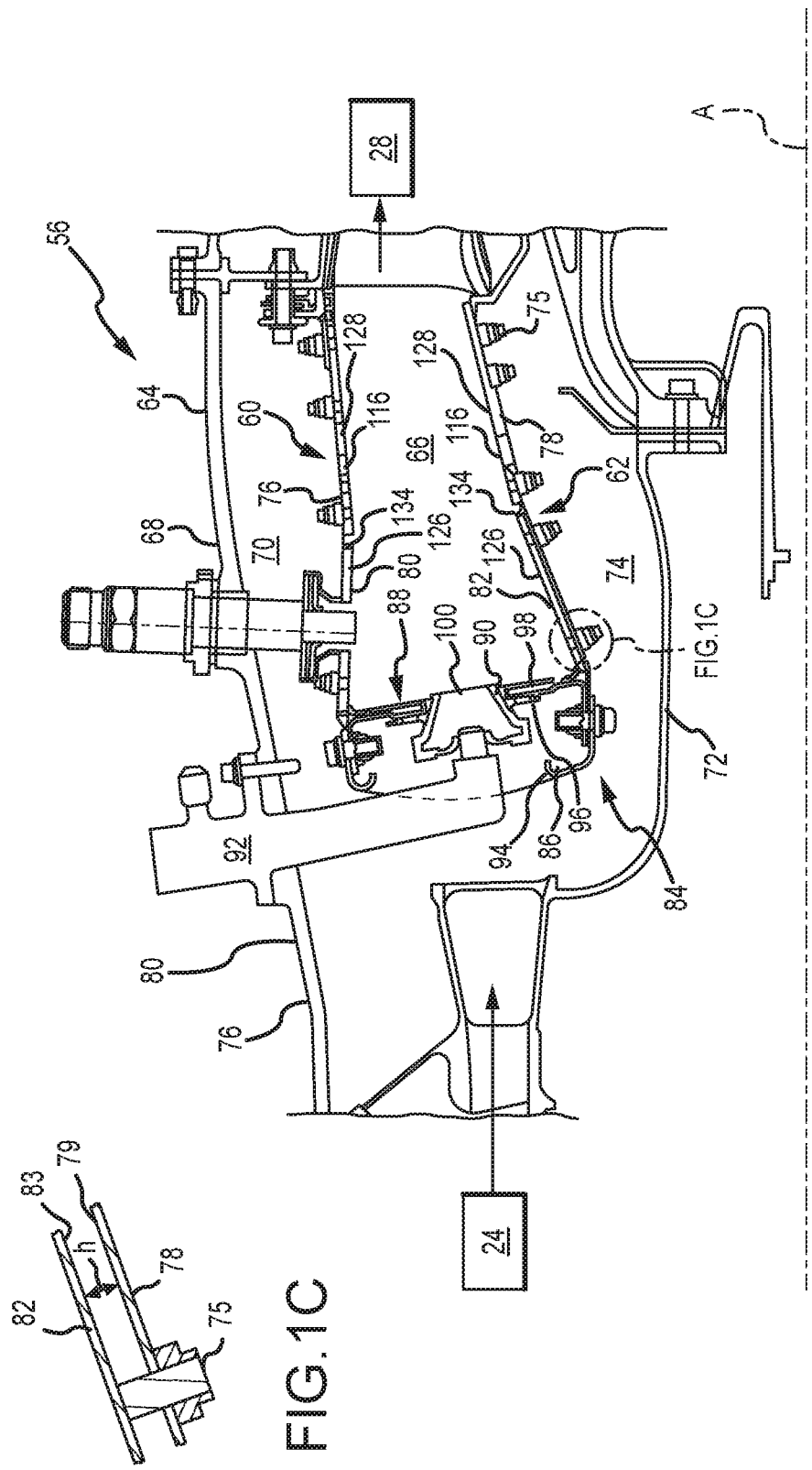

TAPERED PANEL RAIL

FIELD

The present disclosure relates to gas turbine engines and, more particularly, to heat shield panels used in the combustors of gas turbine engines.

BACKGROUND

Gas turbine engines, such as those that power modern commercial and military aircraft, include a fan section to propel the aircraft, a compressor section to pressurize a supply of air from the fan section, a combustor section to burn a hydrocarbon fuel in the presence of the pressurized air, and a turbine section to extract energy from the resultant combustion gases in order to power the compressor and fan sections.

The combustor section typically includes a bulkhead assembly, an inner liner assembly and an outer liner assembly. The bulkhead assembly extends radially between the inner liner assembly and the outer liner assembly to define a combustion chamber. Each liner assembly can be formed from one or more shells and one or more panels attached to the shells. Cooling cavities reside between the panels and the shells and fluidly couple impingement apertures extending through the shells with effusion apertures extending through the panels. Rails extending about the periphery of the panels offset the interior of the panels from the shells to form the cooling cavities.

SUMMARY

A heat shield panel for use in a gas turbine engine combustor is disclosed. In various embodiments, the heat shield panel includes a hot side, a cold side spaced from the hot side, and a rail disposed about a periphery of the cold side, the rail including a first rail member having a first length extending along the panel, a first height extending from the cold side and a first thickness that varies along the first length.

In various embodiments, the first rail member extends in a first direction along the first length and the first thickness varies in a second direction, orthogonal to the first direction, along the first length. In various embodiments, the first rail member includes an outer wall and an inner wall and the outer wall defines an outer dimension that is substantially constant with respect to the second direction along the first length. In various embodiments, the inner wall defines an inner dimension that varies with respect to the second direction along the first length.

In various embodiments, the rail includes a second rail member having a second length and a second thickness that varies along the second length. In various embodiments, the first rail member and the second rail member extend in a first direction along the first length and the second length, respectively, and the first thickness and the second thickness vary in a second direction, orthogonal to the first direction, along the first length and the second length, respectively. In various embodiments, the first rail member includes a first outer wall and a first inner wall, the first outer wall defines a first outer dimension that is substantially constant with respect to the second direction along the first length, and the first inner wall defines a first inner dimension that varies with respect to the second direction along the first length. In various embodiments, the second rail member includes a second outer wall and a second inner wall, the second outer wall defines a second outer dimension that is substantially constant with respect to the second direction along the second length, and the second inner wall defines a second inner dimension that varies with respect to the second direction along the second length.

In various embodiments, the first direction is an axial direction with respect to the heat shield panel and wherein the second direction is a circumferential direction with respect to the heat shield panel. In various embodiments, the first thickness has a first maximum value at a first region intermediate the first length. In various embodiments, the second thickness has a second maximum value at a second region intermediate the second length. In various embodiments, the first rail member and a boss proximate the first region are merged together.

A heat shield panel for use in a combustor of a gas turbine engine is disclosed. In various embodiments, the heat shield panel includes a base member having a hot side surface, a cold side surface and an outer perimeter; and a first rail member disposed on the cold side surface of the base member proximate a first portion of the outer perimeter, the first rail member having a first length extending along the base member, a first height extending from the cold side surface, and a first thickness that varies along the first length.

In various embodiments, the first rail member extends in a first direction along the first length and the first thickness varies in a second direction, orthogonal to the first direction, along the first length. In various embodiments, a second rail member is disposed on the cold side surface of the base member proximate a second portion of the outer perimeter, the second rail member having a second length and a second thickness that varies along the second length.

In various embodiments, the first rail member and the second rail member extend in the first direction along the first length and the second length, respectively, and the first thickness and the second thickness vary in the second direction, orthogonal to the first direction, along the first length and the second length, respectively. In various embodiments, the first direction is an axial direction with respect to the gas turbine engine and the second direction is a circumferential direction with respect to the gas turbine engine. In various embodiments, the first thickness has a first maximum value at a first region intermediate the first length. In various embodiments, the second thickness has a second maximum value at a second region intermediate the second length.

A method of manufacturing a combustor of a gas turbine engine is disclosed. In various embodiments, the method includes the step of providing a base member having a hot side surface, a cold side surface and an outer perimeter; providing a rail member disposed on the cold side surface of the base member proximate a first portion of the outer perimeter, the rail member having a first length and a first thickness; and varying the thickness of the rail member along the first length.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

FIG. 1B is a cross sectional schematic view of a combustor section of a gas turbine engine, in accordance with various embodiments;

FIG. 1C is a close up schematic view of a portion of a heat shield panel of a combustor, in accordance with various embodiments;

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Figure 1A:
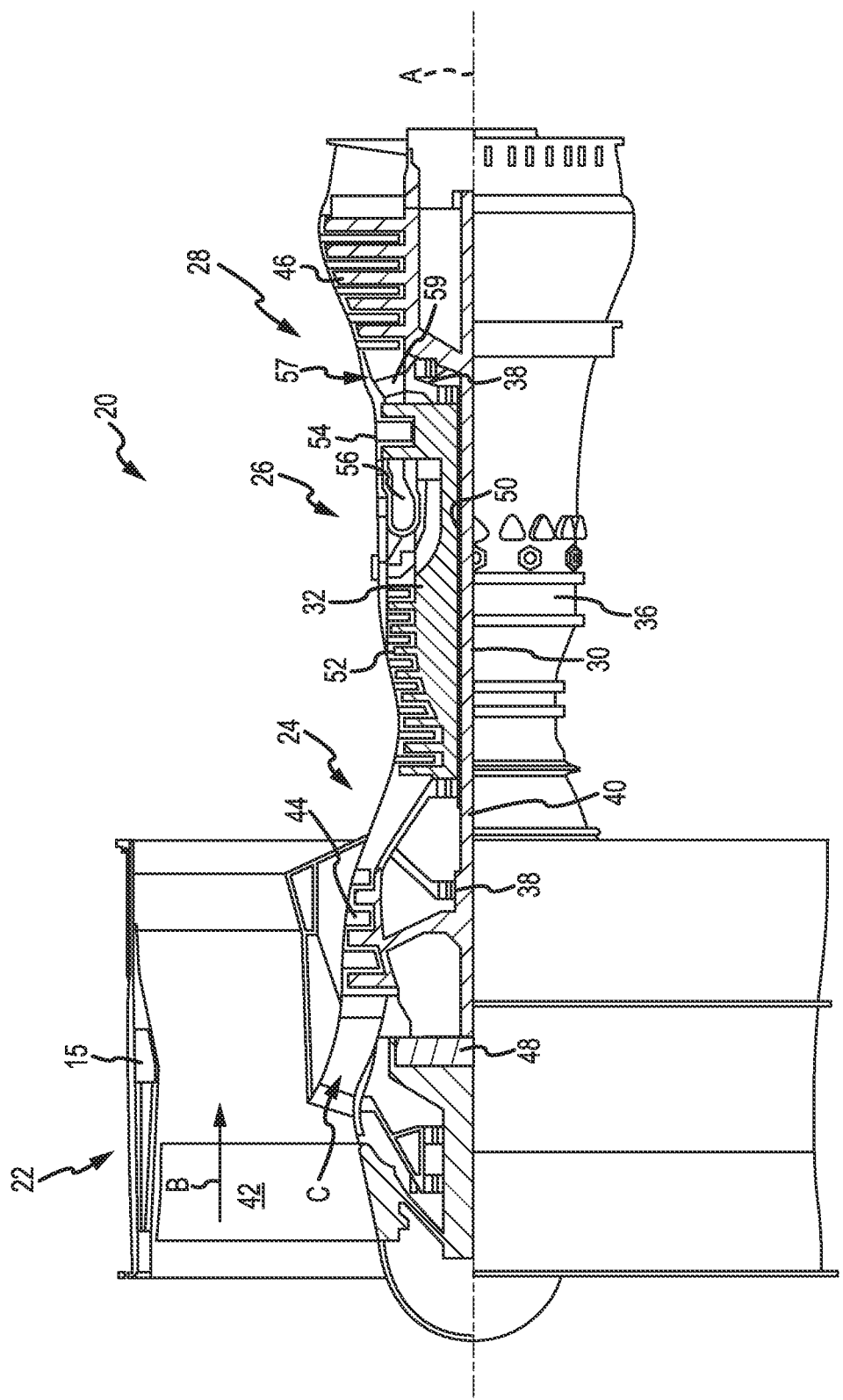
FIG. 1A is a cross sectional schematic view of a gas turbine engine, in accordance with various embodiments.

Referring now to the drawings, FIG. 1A schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, while the compressor section 24 drives air along a primary or core flow path C for compression and communication into the combustor section 26 and then expansion through the turbine section 28. Although depicted as a two-spool turbofan gas turbine engine in the disclosed non-limiting embodiment, it will be understood that the concepts described herein are not limited to use with two-spool turbofans, as the teachings may be applied to other types of turbine engines, including three-spool architectures.

The gas turbine engine 20 generally includes a low speed spool 30 and a high speed spool 32 mounted for rotation about an engine central longitudinal axis A relative to an engine static structure 36 via several bearing systems 38. It should be understood that various bearing systems at various locations may alternatively or additionally be provided and the location of the several bearing systems 38 may be varied as appropriate to the application. The low speed spool 30 generally includes an inner shaft 40 that interconnects a fan 42, a low pressure compressor 44 and a low pressure turbine 46. The inner shaft 40 is connected to the fan 42 through a speed change mechanism, which in this gas turbine engine 20 is illustrated as a fan drive gear system 48 configured to drive the fan 42 at a lower speed than the low speed spool 30. The high speed spool 32 includes an outer shaft 50 that interconnects a high pressure compressor 52 and a high pressure turbine 54. A combustor 56 is arranged in the gas turbine engine 20 between the high pressure compressor 52 and the high pressure turbine 54. A mid-turbine frame 57 of the engine static structure 36 is arranged generally between the high pressure turbine 54 and the low pressure turbine 46 and may include airfoils 59 in the core flow path C for guiding the flow into the low pressure turbine 46. The mid-turbine frame 57 further supports the several bearing systems 38 in the turbine section 28. The inner shaft 40 and the outer shaft 50 are concentric and rotate via the several bearing systems 38 about the engine central longitudinal axis A, which is collinear with longitudinal axes of the inner shaft 40 and the outer shaft 50.

The air in the core flow path C is compressed by the low pressure compressor 44 and then the high pressure compressor 52, mixed and burned with fuel in the combustor 56, and then expanded over the high pressure turbine 54 and low pressure turbine 46. The low pressure turbine 46 and the high pressure turbine 54 rotationally drive the respective low speed spool 30 and the high speed spool 32 in response to the expansion. It will be appreciated that each of the positions of the fan section 22, the compressor section 24, the combustor section 26, the turbine section 28, and the fan drive gear system 48 may be varied. For example, the fan drive gear system 48 may be located aft of the combustor section 26 or even aft of the turbine section 28, and the fan section 22 may be positioned forward or aft of the location of the fan drive gear system 48.

Referring to FIG. 1B, the combustor 56 may generally include an outer liner assembly 60, an inner liner assembly 62 and a diffuser case module 64 that surrounds the outer liner assembly 60 and the inner liner assembly 62. A combustion chamber 66, positioned within the combustor 56, has a generally annular configuration, defined by and comprising the outer liner assembly 60, the inner liner assembly 62 and a bulkhead liner assembly 88. The outer liner assembly 60 and the inner liner assembly 62 are generally cylindrical and radially spaced apart, with the bulkhead liner assembly 88 positioned generally at a forward end of the combustion chamber 66. The outer liner assembly 60 is spaced radially inward from an outer diffuser case 68 of the diffuser case module 64 to define an outer annular plenum 70. The inner liner assembly 62 is spaced radially outward from an inner diffuser case 72 of the diffuser case module 64 to define, in-part, an inner annular plenum 74. Although a particular combustor is illustrated, it should be understood that other combustor types with various combustor liner arrangements will also benefit from this disclosure.

The combustion chamber 66 contains the combustion products that flow axially toward the turbine section 28. The outer liner assembly 60 includes an outer support shell 76 and the inner liner assembly 62 includes an inner support shell 78. The outer support shell 76 supports one or more outer panels 80 and the inner support shell 78 supports one or more inner panels 82. Each of the outer panels 80 and the inner panels 82 may be formed of a plurality of floating panels that are generally rectilinear and manufactured from, for example, a nickel based super alloy that may be coated with a ceramic or other temperature resistant material, and are arranged to form a panel configuration mounted to the respective outer support shell 76 and inner support shell 78. In various embodiments, the combination of the outer support shell 76 and the outer panels 80 is referred to an outer heat shield or outer heat shield liner, while the combination of the inner support shell 78 and the inner panels 82 is referred to as an inner heat shield or inner heat shield liner. In various embodiments, the panels are secured to the shells via one or more attachment mechanisms 75, which may each comprise a threaded stud and nut assembly.

The combustor 56 further includes a forward assembly 84 that receives compressed airflow from the compressor section 24 located immediately upstream. The forward assembly 84 generally includes an annular hood 86, the bulkhead liner assembly 88, and a plurality of swirlers 90 (one shown). Each of the swirlers 90 is aligned with a respective one of a plurality of fuel nozzles 92 (one shown) and a respective one of a plurality of hood ports 94 (one shown) to project through the bulkhead liner assembly 88; generally, the pluralities of swirlers 90, fuel nozzles 92 and hood ports 94 are circumferentially distributed about the annular hood 86 and the bulkhead liner assembly 88. The bulkhead liner assembly 88 includes a bulkhead support shell 96 secured to the outer liner assembly 60 and to the inner liner assembly 62 and a plurality of bulkhead panels 98 secured to the bulkhead support shell 96; generally, the bulkhead panels 98 are circumferentially distributed about the bulkhead liner assembly 88. The bulkhead support shell 96 is generally annular and the plurality of bulkhead panels 98 is segmented, typically one panel to each of the fuel nozzles 92 and swirlers 90. The annular hood 86 extends radially between, and is secured to, the forward-most ends of the outer liner assembly 60 and the inner liner assembly 62. Each of the hood ports 94 receives a respective one of the plurality of fuel nozzles 92 and facilitates the direction of compressed air into the forward end of the combustion chamber 66 through a respective one of a plurality of swirler openings 100. Each of the fuel nozzles 92 may be secured to the diffuser case module 64 and project through a respective one of the hood ports 94 and into a respective one of the swirlers 90.

The forward assembly 84 introduces core compressed air into the forward section of the combustion chamber 66 while the remainder of the compressed air enters the outer annular plenum 70 and the inner annular plenum 74. The plurality of fuel nozzles 92 and adjacent structure generate a blended fuel-air mixture that supports stable combustion in the combustion chamber 66. Air in the outer annular plenum 70 and the inner annular plenum is also introduced into the combustion chamber 66 via a plurality of orifices 116, which may include dilution holes or air feed holes of various dimension. The outer support shell 76 may also include a plurality of impingement holes (discussed further below) that introduce cooling air from the outer annular plenum 70 into a space between the outer support shell 76 and a cool side of the outer panels 80. The cooling air is then communicated through a plurality of effusion holes in the outer panels 80 to form a cooling air film across a hot side of the outer panels 80 to thermally protect the outer panels 80 from hot combustion gases. Similarly, the inner support shell 78 may include a plurality of impingement holes that introduce cooling air from the inner annular plenum 74 into a space between the inner support shell 78 and a cool side of the inner panels 82. The cooling air is then communicated through a plurality of effusion holes in the inner panels 82 to form a cooling air film across a hot side of the inner panels 82 to thermally protect the inner panels 82 from hot combustion gases.

Referring briefly to FIG. 1C, in various embodiments, a height (h) in a radial direction extends from a cold side 83 (or cold side surface) of the inner panels 82 to an adjacent side 79 of the inner support shell 78, thereby defining a cooling chamber having the height (h) between the cold side 83 of the inner panels 82 and the adjacent side 79 of the inner support shell 78. In various embodiments, a similar cooling chamber exists between the outer panels 80 and the outer support shell 76. In various embodiments, as described below, the cooling chambers are maintained, in part, by one or more rail members that extend from the cold sides of the panels and make contact with or abut the adjacent sides of the corresponding support shell, thereby separating the cold sides from the adjacent sides by the height (h).

Figure 1D:
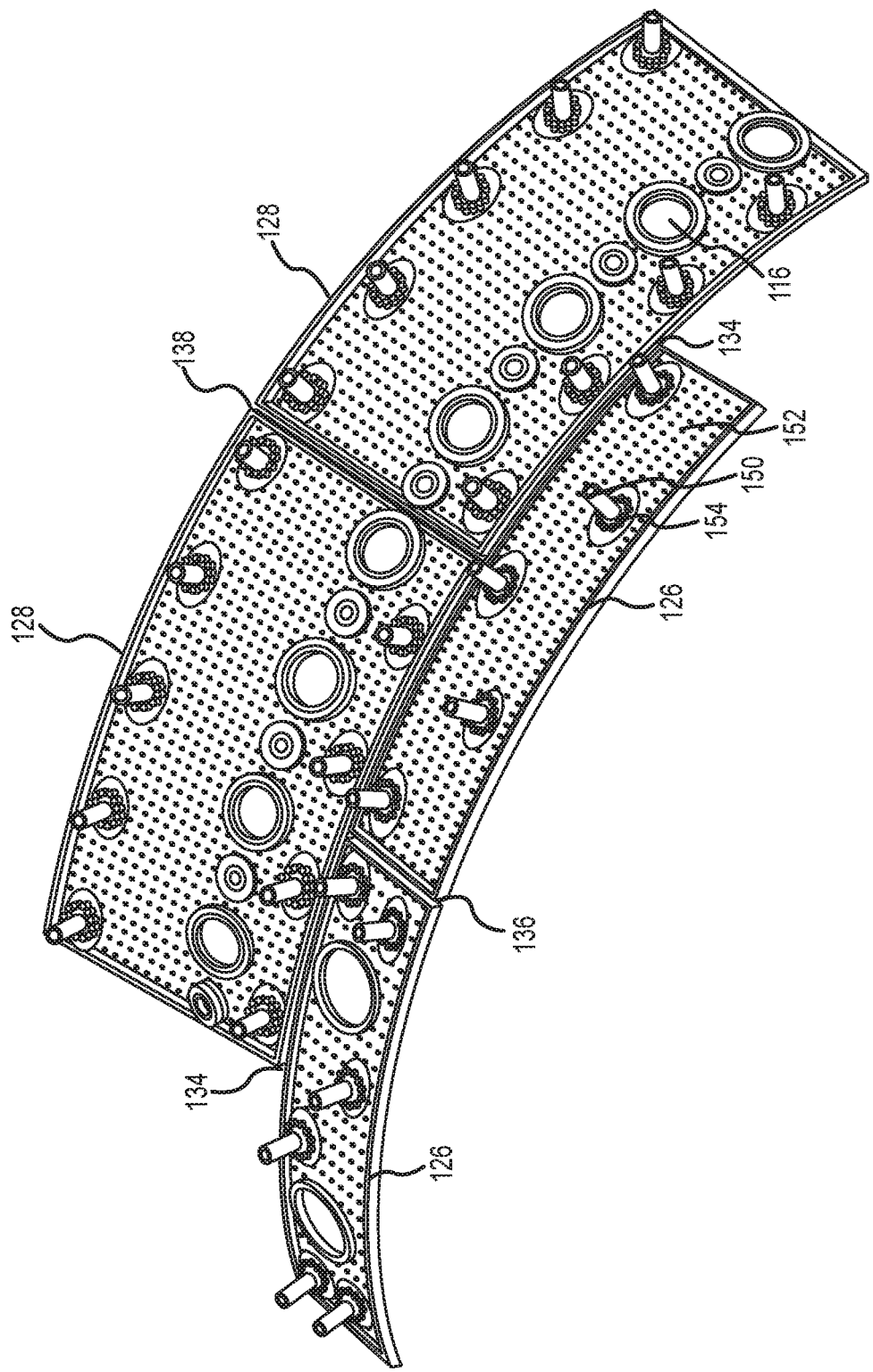
FIG. 1D is a perspective schematic view of a heat shield panel arrangement of a combustor, viewing from the cold side, in accordance with various embodiments.

Turning now to FIG. 1D (with continued reference to FIG. 1B), an illustration of a configuration of circumferentially adjacent first panels 126 and circumferentially adjacent second panels 128 installed within the combustor 56 is shown. The circumferentially adjacent first panels 126 are installed to extend circumferentially about the combustion chamber 66 and form a first axially extending gap 136 between the circumferentially adjacent first panels 126. Similarly, the circumferentially adjacent second panels 128 are installed to extend circumferentially about the combustion chamber 66 and form a second axially extending gap 138 between the circumferentially adjacent second panels 128. A first circumferentially extending gap 134 is also formed between the circumferentially adjacent first panels 126 and the circumferentially adjacent second panels 128 when positioned axially adjacent one another. Similar axially extending and circumferentially extending gaps are formed between similar panels positioned throughout the combustion chamber 66. The first circumferentially extending gap 134, the first axially extending gap 136 and the second axially extending gap 138 accommodate movement or thermal expansion of the circumferentially adjacent first panels 126 and the circumferentially adjacent second panels 128. Also shown in FIG. 1D is a plurality of orifices 116, that may include dilution holes or air feed holes of various dimension, a plurality of effusion holes 152 and a shield attachment mechanism, which includes a stud 150 and a plurality of spacer pins 154.

Figure 2:
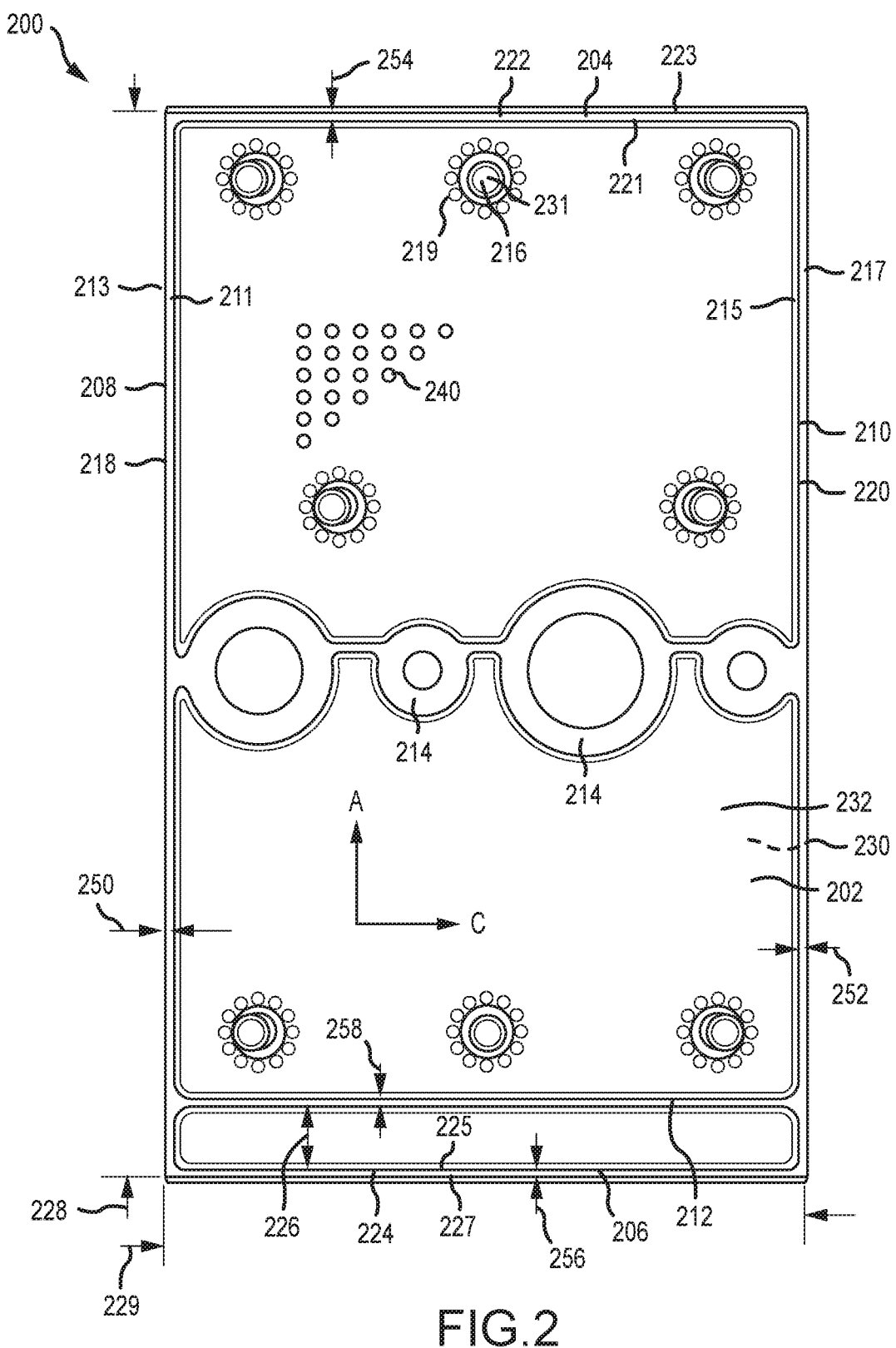
FIG. 2 is an overhead schematic view of a heat shield panel of a combustor, viewing from the cold side, in accordance with various embodiments.

Referring now to FIG. 2, a heat shield panel 200 (or combustor panel segment) is illustrated, according to various embodiments, with reference to a circumferential (C) and axial (A) coordinate system. The heat shield panel 200 includes a base 202 and a plurality of rail members, including a first axial rail member 204, a second axial rail member 206, spaced an axial distance from the first axial rail member 204, a first circumferential rail member 208, a second circumferential rail member 210, spaced a circumferential distance from the first circumferential rail member 208 and an intermediate rail member 212. The heat shield panel 200 may also include one or more dilution apertures 214 and one or more mechanical attachments 216, which may include a threaded stud 231 and a plurality of protrusions 219 (e.g., spacers or pins) arranged around the threaded stud 231. In various embodiments, the base 202 may be configured as a generally curved (e.g., arcuate) plate, that may be either convex or concave, depending on whether the panel is part of an outer liner assembly or an inner liner assembly, respectively. The base 202 extends circumferentially between a first circumferential end 218 and a second circumferential end 220 and axially between an upstream axial end 222 and a downstream axial end 224. In various embodiments, the first axial rail member 204, the second axial rail member 206, the first circumferential rail member 208 and the second circumferential rail member 210 are configured to extend about an outer periphery or perimeter of the base 202.

In various embodiments, the first axial rail member 204, the second axial rail member 206, the first circumferential rail member 208 and the second circumferential rail member 210 define, in part, a height (h) (see, e.g., FIG. 1C) in a radial direction that extends from a cold side 232 (or cold side surface) of the heat shield panel 200 to the radially oriented outer surfaces of the various rail members that are configured to make contact with or abut the surface of a corresponding inner or outer support shell. In various embodiments, the first axial rail member 204, the second axial rail member 206, the first circumferential rail member 208 and the second circumferential rail member 210 define, in part, a boundary wall that extends lengthwise about all four sides of the heat shield panel 200 at or near the periphery or perimeter of the heat shield panel 200. In various embodiments, the boundary wall extends continuously about or near the periphery or perimeter of the heat shield panel 200. In various embodiments, the boundary wall projects in the radial direction from the cold side 232 and is configured to make contact with or abut the surface of the corresponding inner or outer support shell, thereby defining a cooling chamber having the height (h) between the cold side 232 and an adjacent side of the corresponding inner or outer shell.

In various embodiments, the several rail members are connected to (e.g., formed integral with) the base 202. The first circumferential rail member 208 is located at (e.g., on, adjacent or proximate) the first circumferential end 218. The second circumferential rail member 210 is located at the second circumferential end 220. The first circumferential rail member 208 and the second circumferential rail member 210 may extend longitudinally (e.g., in an axial direction) along the base 202 and be substantially parallel with one another. The first axial rail member 204 is located at the upstream axial end 222 and the second axial rail member 206 is located at the downstream axial end 224. The intermediate rail member 212 is located axially between the first axial rail member 204 and the second axial rail member 206. The intermediate rail member 212, for example, may be located a distance 226 (e.g., an axial distance) away from the second axial rail member 206 that is equal to between about one-fifteenth (1/15) and about one-quarter (1/4) of an axial length 228 of the base 202. The first axial rail member 204, the second axial rail member 206 and the intermediate rail member 212 may be substantially parallel with one another, extend circumferentially along the base 202 and be connected to the first circumferential rail member 208 and the second circumferential rail member 210. The heat shield panel 200 has a hot side 230 (the under surface in FIG. 2) exposed to hot combustion gases and a cold side 232 exposed to cooling fluid received from impingement holes extending through a corresponding shell. A plurality of holes 240 (e.g., effusion holes) extend through the heat shield panel 200 and serve to provide a film of cool air on the hot side 230 of the heat shield panel 200.

In various embodiments, the first circumferential rail member 208 and the second circumferential rail member 210 are defined, at least in part, by a first circumferential rail thickness 250 and a second circumferential rail thickness 252, respectively. In various embodiments, one or both of the first circumferential rail thickness 250 and the second circumferential rail thickness 252 may vary in circumferential thickness along the axial length 228 of the base 202. In various embodiments, the first circumferential rail member 208 includes a first circumferential rail member inner wall 211 (or inner wall) and a first circumferential rail member outer wall 213 (or outer wall) and the second circumferential rail member 210 includes a second circumferential rail member inner wall 215 (or inner wall) and a second circumferential rail member outer wall 217 (or outer wall). In various embodiments, the first circumferential rail thickness 250 is configured to vary along the axial length 228 by maintaining the first circumferential rail member outer wall 213 at a constant circumferential dimension while varying the circumferential dimension of the first circumferential rail member inner wall 211. In various embodiments, the second circumferential rail thickness 252 is configured to vary along the axial length 228 by maintaining the second circumferential rail member outer wall 217 at a constant circumferential dimension while varying the circumferential dimension of the second circumferential rail member inner wall 215.

Similarly, in various embodiments, the first axial rail member 204 and the second axial rail member 206 are defined, at least in part, by a first axial rail thickness 254 and a second axial rail thickness 256, respectively. In various embodiments, one or both of the first axial rail thickness 254 and the second axial rail thickness 256 may vary in axial thickness along a circumferential length 229 of the base 202. In various embodiments, the first axial rail member 204 includes a first axial rail member inner wall 221 (or inner wall) and a first axial rail member outer wall 223 (or outer wall) and the second axial rail member 206 includes a second axial rail member inner wall 225 (or inner wall) and a second axial rail member outer wall 227 (or outer wall). In various embodiments, the first axial rail thickness 255 is configured to vary along the circumferential length 229 by maintaining the first axial rail member outer wall 223 at a constant axial dimension while varying the axial dimension of the first axial rail member inner wall 221. In various embodiments, the second axial rail thickness 256 is configured to vary along the circumferential length 229 by maintaining the second axial rail member outer wall 227 at a constant axial dimension while varying the axial dimension of the second axial rail member inner wall 225.

In various embodiments, the intermediate rail member 212 is defined, at least in part, by an intermediate rail thickness 258. In various embodiments, the intermediate rail thickness 258 may vary in thickness (e.g., in axial thickness) along the circumferential length 229 of the base 202. In various embodiments, one or more of the first circumferential rail thickness 250, the second circumferential rail thickness 252, the first axial rail thickness 254, the second axial rail thickness 256 and the intermediate rail thickness 258 may be defined by a nominal thickness in the range from about 0.020 inches (0.508 mm) to about 0.060 inches (1.524 mm) and, in various embodiments, the nominal thickness may be about 0.040 inches (1.016 mm). In various embodiments, the range of variation of one or more of the first circumferential rail thickness 250, the second circumferential rail thickness 252, the first axial rail thickness 254, the second axial rail thickness 256 and the intermediate rail thickness 258 may be on the order of about one-half (1/2) times the nominal thickness to about five (5) times the nominal thickness.

Figure 3:
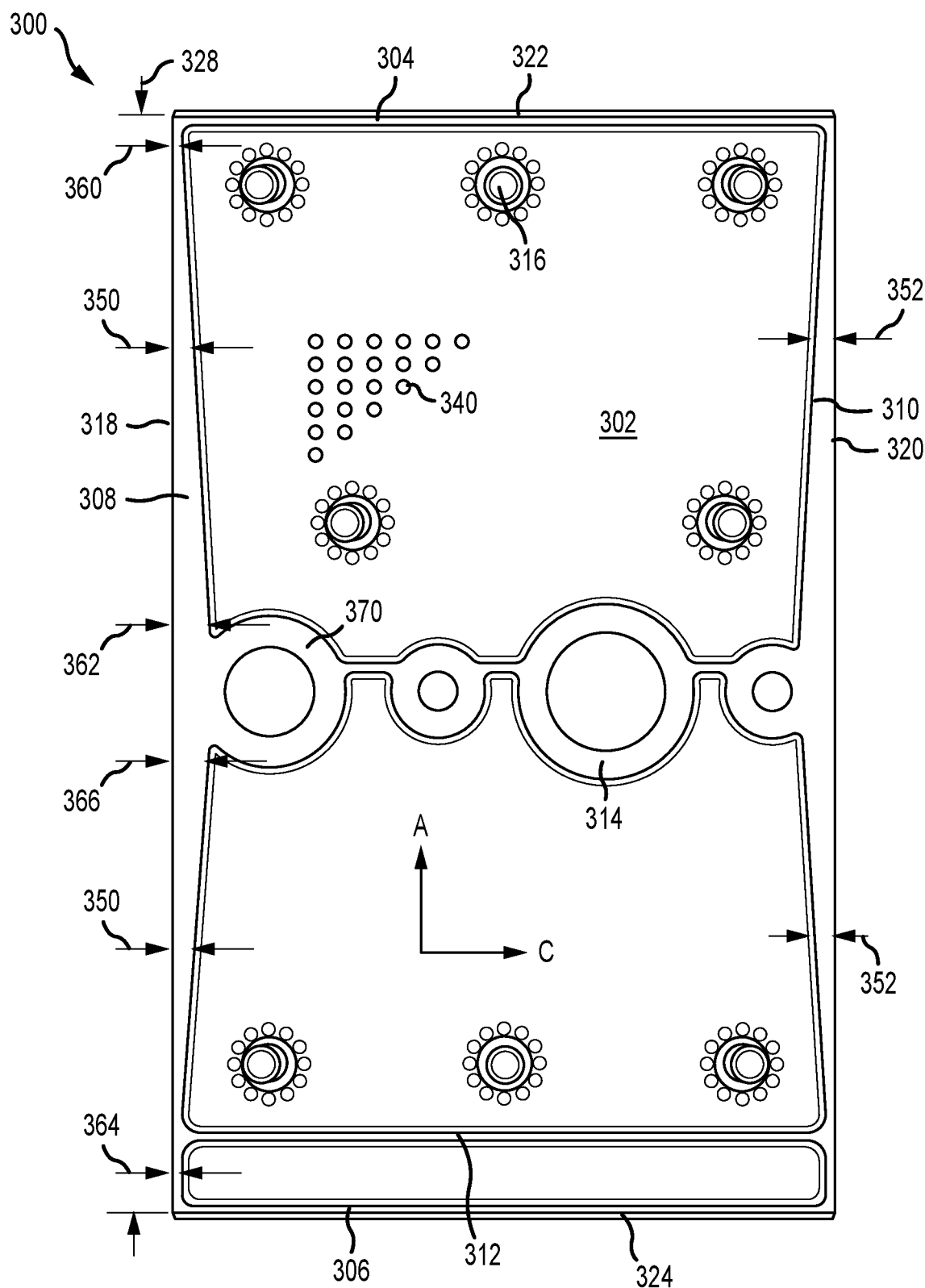
FIG. 3 is an overhead schematic view of a heat shield panel of a combustor, viewing from the cold side, in accordance with various embodiments.

Referring now to FIG. 3, a heat shield panel 300 (or combustor panel segment) is illustrated, according to various embodiments. Similar to the heat shield panel 200 described above with reference to FIG. 2, the heat shield panel 300 includes a base 302 and a plurality of rail members, including a first axial rail member 304, a second axial rail member 306, a first circumferential rail member 308, a second circumferential rail member 310 and an intermediate rail member 312. The heat shield panel 300 may also include one or more dilution apertures 314 and one or more mechanical attachments 316, similar to those described above with reference to FIG. 2. The base 302 extends circumferentially between a first circumferential end 318 and a second circumferential end 320 and axially between an upstream axial end 322 and a downstream axial end 324.

In various embodiments, the first circumferential rail member 308 and the second circumferential rail member 310 are defined, at least in part, by a first circumferential rail thickness 350 and a second circumferential rail thickness 352, respectively, that vary in circumferential thickness along an axial length 328 of the base 302, running from the first axial rail member 304 to the second axial rail member 306. In various embodiments, the first circumferential rail member 308 varies from a first circumferential thickness 360, located proximate the intersection of the first circumferential rail member 308 and the first axial rail member 304, to a second circumferential thickness 362, located intermediate the axial length 328. Similarly, in various embodiments, the first circumferential rail member 308 varies from a third circumferential thickness 364, located proximate the intersection of the first circumferential rail member 308 and the second axial rail member 306, to a fourth circumferential thickness 366, located intermediate the axial length 328. In various embodiments, the locations of the second circumferential thickness 362 and the fourth circumferential thickness 366 merge at the same intermediate location along the axial length 328 of the base 302 and define a maximum circumferential thickness of the first circumferential rail member 308. In various embodiments, the locations of the second circumferential thickness 362 and the fourth circumferential thickness 366 each merge into a boss member 370 that defines one of the one or more dilution apertures 314, with the boss member 370 being located intermediate the axial length 328. A similar description applies to the second circumferential rail thickness 352, so need not be repeated here.

In various embodiments, one or both of the first circumferential rail thickness 350 and the second circumferential rail thickness 352 may be defined by a nominal thickness in the range from about 0.020 inches (0.508 mm) to about 0.060 inches (1.524 mm) and, in various embodiments, the nominal thickness may be about 0.040 inches (1.016 mm). In various embodiments, the range of variation of one or both of the first circumferential rail thickness 350 and the second circumferential rail thickness 352 may be on the order of about one-half (½) times the nominal thickness to about five (5) times the nominal thickness. For example, in various embodiments, the nominal thickness may be equal to the axial thickness of one or both of the first axial rail member 304 and the second axial rail member 306, the first circumferential thickness 360 (or the third circumferential thickness 364) may be about one-half (½) to about one (1) times the nominal thickness and the second circumferential thickness 362 (or the fourth circumferential thickness 366) may be about two (2) times to about five (5) times the nominal thickness.

Figure 4:
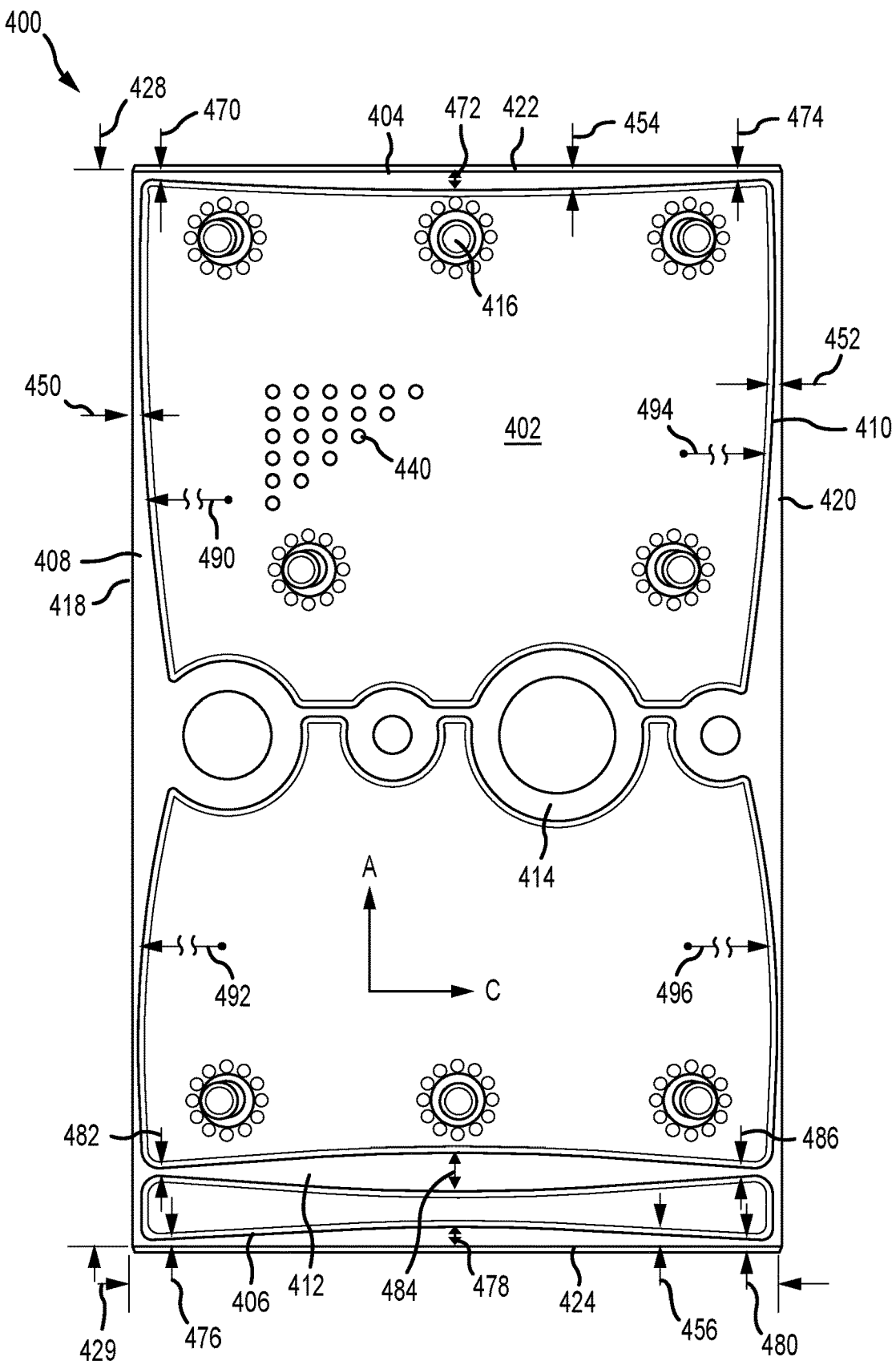
FIG. 4 is an overhead schematic view of a heat shield panel of a combustor, viewing from the cold side, in accordance with various embodiments.

Referring now to FIG. 4, a heat shield panel 400 (or combustor panel segment) is illustrated, according to various embodiments. Similar to the heat shield panel 200 described above with reference to FIG. 2, the heat shield panel 400 includes a base 402 and a plurality of rail members, including a first axial rail member 404, a second axial rail member 406, a first circumferential rail member 408, a second circumferential rail member 410 and an intermediate rail member 412. The heat shield panel 400 may also include one or more dilution apertures 414 and one or more mechanical attachments 416, similar to those described above with reference to FIG. 2. The base 402 extends circumferentially between a first circumferential end 418 and a second circumferential end 420 and axially between an upstream axial end 422 and a downstream axial end 424.

In various embodiments, the first circumferential rail member 408 and the second circumferential rail member 410 are defined, at least in part, by a first circumferential rail thickness 450 and a second circumferential rail thickness 452, respectively, that vary in circumferential thickness along an axial length 428 of the base 402, running from the first axial rail member 404 to the second axial rail member 406. In various embodiments, one or both of the first circumferential rail thickness 450 and the second circumferential rail thickness 452 may vary in circumferential thickness along the axial length 428 of the base 402, similar to that described above with reference to FIG. 3.

Similarly, in various embodiments, the first axial rail member 404 and the second axial rail member 406 are defined, at least in part, by a first axial rail thickness 454 and a second axial rail thickness 456, respectively. In various embodiments, one or both of the first axial rail thickness 454 and the second axial rail thickness 456 may vary in axial thickness along a circumferential length 429 of the base 402. For example, in various embodiments, the first axial rail member 404 varies from a first axial thickness 470, located proximate the intersection of the first axial rail member 404 and the first circumferential rail member 408, to a second axial thickness 472, located intermediate the circumferential length 429, to a third axial thickness 474, located proximate the intersection of the first axial rail member 404 and the second circumferential rail member 410. Similarly, in various embodiments, the second axial rail member 406 varies from a first axial thickness 476, located proximate the intersection of the second axial rail member 406 and the first circumferential rail member 408, to a second axial thickness 478, located intermediate the circumferential length 429, to a third axial thickness 480, located proximate the intersection of the second axial rail member 406 and the second circumferential rail member 410. As illustrated, in various embodiments, the axial thickness of both the first axial rail member 404 and the second axial rail member increase from a nominal thickness at the ends to a maximum thickness intermediate the circumferential length 429. In various embodiments, the intermediate rail member 412 includes a similar variation in axial thickness, varying from a first axial thickness 482, located proximate the intersection with the first circumferential rail member 408, to a second axial thickness 484, located intermediate the circumferential length 429, to a third axial thickness 486, located proximate the intersection with the second circumferential rail member 410.

Still referring to FIG. 4, in various embodiments, each of the variations in axial and circumferential thickness of the various rail members is configured to smoothly transit from one end to the other. For example, the first circumferential rail thickness 450 of the first circumferential rail member 408 may be defined by a first radius of curvature 490 and a second radius of curvature 492 may vary along the axial length 428, such that the ends of the rail member (i.e., the portions of the first circumferential rail member 408 proximate the corresponding axial rail members) are defined by essentially infinite radii of curvature (or straight lines) with the radii of curvature decreasing toward the regions of maximum thickness intermediate the axial length 428. A third radius of curvature 494 and a fourth radius of curvature 496 may similarly define the second circumferential rail thickness 452. In various embodiments, such geometries may be defined by a sine function, wherein regions of minimum thickness at the ends of the rail member are essentially tangent and the regions of maximum thickness are represented by the amplitude of the sine function. Variations in the first axial rail thickness 454, the second axial rail thickness 456 and the thickness of the intermediate rail member 412 may be similarly described.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A heat shield panel for use in a gas turbine engine combustor, comprising:
    a hot side;
    a cold side spaced from the hot side; and
    a rail disposed about a periphery of the cold side, the rail including a first rail member having a first length extending along the panel, a first height extending from the cold side, and a first thickness that varies along the first length,
        wherein the first rail member extends in a first direction along the first length and wherein the first thickness varies continuously in a second direction, orthogonal to the first direction, along the first length, from a nominal thickness, located proximate a first end of the heat shield panel, to a maximum thickness, greater than the nominal thickness, located intermediate the first end and a second end of the heat shield panel, and from the maximum thickness, located intermediate the first end and the second end, to the nominal thickness located proximate the second end of the heat shield panel.

2. The heat shield panel of claim 1, wherein the first rail member includes an outer wall and an inner wall and wherein the outer wall defines an outer dimension that is substantially constant with respect to the second direction along the first length.

3. The heat shield panel of claim 2, wherein the inner wall defines an inner dimension that varies with respect to the second direction along the first length.

4. The heat shield panel of claim 1, wherein the rail includes a second rail member having a second length and a second thickness that varies along the second length.

5. The heat shield panel of claim 4, wherein the first rail member and the second rail member extend in the first direction along the first length and the second length, respectively, and wherein the first thickness and the second thickness vary in the second direction, orthogonal to the first direction, along the first length and the second length, respectively.

6. The heat shield panel of claim 5, wherein the first rail member includes a first outer wall and a first inner wall and wherein the first outer wall defines a first outer dimension that is substantially constant with respect to the second direction along the first length and wherein the first inner wall defines a first inner dimension that varies with respect to the second direction along the first length.

7. The heat shield panel of claim 6, wherein the second rail member includes a second outer wall and a second inner wall and wherein the second outer wall defines a second outer dimension that is substantially constant with respect to the second direction along the second length and wherein the second inner wall defines a second inner dimension that varies with respect to the second direction along the second length.

8. The heat shield panel of claim 7, wherein the first direction is an axial direction with respect to the heat shield panel and wherein the second direction is a circumferential direction with respect to the heat shield panel.

9. The heat shield panel of claim 7, wherein the first thickness has a first maximum value at a first region intermediate the first length.

10. The heat shield panel of claim 9, wherein the second thickness has a second maximum value at a second region intermediate the second length.

11. The heat shield panel of claim 9, wherein the first rail member and a boss proximate the first region are merged together.

12. A heat shield panel for use in a combustor of a gas turbine engine, comprising:
  a base member having a hot side surface, a cold side surface and an outer perimeter; and
  a first rail member disposed on the cold side surface of the base member proximate a first portion of the outer perimeter, the first rail member having a first length extending along the base member, a first height extending from the cold side surface, and a first thickness that varies along the first length,
    wherein the first rail member extends in a first direction along the first length and wherein the first thickness varies continuously in a second direction, orthogonal to the first direction, along the first length, from a nominal thickness, located proximate a first end of the heat shield panel, to a maximum thickness, greater than the nominal thickness, located intermediate the first end and a second end of the heat shield panel, and from the maximum thickness, located intermediate the first end and the second end, to the nominal thickness located proximate the second end of the heat shield panel.

13. The heat shield panel of claim 12, further comprising a second rail member disposed on the cold side surface of the base member proximate a second portion of the outer perimeter, the second rail member having a second length and a second thickness that varies along the second length.

14. The heat shield panel of claim 13, wherein the first rail member and the second rail member extend in the first direction along the first length and the second length, respectively, and wherein the first thickness and the second thickness vary in the second direction, orthogonal to the first direction, along the first length and the second length, respectively.

15. The heat shield panel of claim 14, wherein the first direction is an axial direction with respect to the gas turbine engine and wherein the second direction is a circumferential direction with respect to the gas turbine engine.

16. The heat shield panel of claim 15, wherein the first thickness has a first maximum value at a first region intermediate the first length.

17. The heat shield panel of claim 16, wherein the second thickness has a second maximum value at a second region intermediate the second length.

18. A method of manufacturing a heat shield panel for a combustor of a gas turbine engine, comprising:
  forming a base member having a hot side surface, a cold side surface and an outer perimeter; and
  forming a rail member disposed on the cold side surface of the base member proximate a first portion of the outer perimeter, the rail member having a length and a thickness,
    wherein the rail member extends in a first direction along the length and wherein the thickness varies continuously in a second direction, orthogonal to the first direction, along the length, from a nominal thickness, located proximate a first end of the heat shield panel, to a maximum thickness, greater than the nominal thickness, located intermediate the first end and a second end of the heat shield panel, and from the maximum thickness, located intermediate the first end and the second end, to the nominal thickness located proximate the second end of the heat shield panel.

\* \* \* \* \*